United States Patent [19]

Erickson et al.

[11] 4,192,081
[45] Mar. 11, 1980

[54] FOOD DEHYDRATING MACHINE

[75] Inventors: Chad S. Erickson; David A. Dornbush, both of Minneapolis, Minn.

[73] Assignee: Alternative Pioneering Systems, Inc., Bloomington, Minn.

[21] Appl. No.: 806,774

[22] Filed: Jun. 15, 1977

[51] Int. Cl.² .............................................. A47G 23/04
[52] U.S. Cl. ........................................ 34/225; 34/238; 34/233; 99/483
[58] Field of Search ................. 34/30, 34, 48, 54, 225, 34/233, 237, 238; 99/483; 312/236

[56] References Cited

U.S. PATENT DOCUMENTS

| | | | |
|---|---|---|---|
| 1,889,880 | 12/1932 | Smith | 34/238 |
| 1,954,239 | 4/1934 | Doherty | 34/225 X |
| 2,606,372 | 8/1952 | Foulder | 34/225 X |
| 3,261,650 | 7/1966 | Stromqvist | 34/225 UX |
| 4,030,476 | 6/1977 | Hock | 312/236 X |

*Primary Examiner*—Harold W. Weakley
*Attorney, Agent, or Firm*—Norman P. Friederichs

[57] ABSTRACT

A machine for dehydrating food, as an aid toward preservation of food for extended periods of time. Intake air may be obtained from either the exterior of the machine or a combination of exterior and recycled air. Intake air is electrically heated and pressurized in a plenum chamber by a fan. The pressurized and heated air is released in a uniform laminer flow through a set of small openings, thence along horizontally disposed shelves containing the food to be dried. The air is then selectively discharged into the atmosphere or a portion thereof is recycled and combined with new intake air and again passed over the food to be dehydrated. The percentage of recycled air is selectively variable over a wide range. Removable frames support either solid sheets or screens having mesh openings of desired sizes which support the food to be dried. The choice of a solid sheet or the mesh size depends upon the type of food to be dried. The intake air is filtered and the electrical heater is temperature controlled by a thermister-triac combination of bi-metallic thermostat which senses the temperature within the plenum and controls the current flowing through the electrical heating element.

3 Claims, 6 Drawing Figures

FOOD DEHYDRATING MACHINE

BACKGROUND OF THE INVENTION

This invention relates generally to food treating apparatus and more specifically to the design of a novel food dehydrating device which offers greater control over the drying process than has been possible heretofore.

DESCRIPTION OF THE PRIOR ART

An existing method of preserving food is air drying, which in its most primitive form, namely drying in the sun, has existed for a great length of time.

With the advent of modern technology a number of food dehydrators have been developed for home and industrial use. A typical dehydrator such as that disclosed in the Kilbury U.S. Pat. No. 2,412,407 will utilize a blower of some type to draw in air from the atmosphere over electrical heating coils or other suitable source of heat energy and discharge this air across the food being treated which is disposed in the path of the air, and thence back into the atmosphere.

Prior art devices also utilized various temperature controls and air channeling arrangements. However, the existing devices do not provide for control of the air flow within the drying chamber other than the resistance imposed by the trays or shelves and the food against the thrust of the blower. The existing devices need a relatively high velocity air flow which requires a large fan to attempt to ensure flow over all of the food. If high air velocity is not provided in the known devices, a non-uniform flow is obtained and some foods are subjected to a much greater flow of air than foods in other areas of the drying chamber.

Conventional dehydrators, such as those disclosed in the Fuller U.S. Pat. No. 2,357,946 and the Eskamp U.S. Pat. No. 2,017,728 have no provision for the recirculation of the air over the foods to save fuel costs or to meet the requirements of particular foods, or at best, will have only one or two fixed settings of recirculated plus make-up air.

Also, the grids upon which the foods are disposed for drying generally have one small sized opening therein for all foods, regardless of their size and nature.

SUMMARY OF THE INVENTION

The present invention provides a new and improved dehydrating oven for the drying of solid and liquid foodstuffs. The present oven assures uniform moisture removal from foodstuffs without regard to location of the food within the drying chamber. The present oven conserves energy and more closely matches the drying characteristics of a number of foods by means of varying the ratio between outside and recirculate air. The oven may have removable perforate food-supporting surfaces which permit air contact with the underside of the foods being dried.

In accordance with the teachings of the present invention there is provided a food dehydrator in which heated, pressurized air is applied in a controlled fashion over the entire zone containing the food to be dried. This minimizes stagnant areas. In addition, an air valve is provided which permits selection of any of a wide range of ratios of atmosphere make-up air to recirculated air.

An additional feature of the present invention is the use of trays including supporting sheets for the foods. The supporting sheets may be screens of various mesh sizes depending upon the food to be dried. If coarse food pieces such as carrots are being dried, coarse screen sheet may be used, for example, one-half inch grid. If fine food pieces such as herbs are being dried, fine screen may be used. Alternatively, if desired, the food supporting trays can be made of a solid sheet. This is particularly suitable if the food being treated is originally in a paste or slurry state. The supporting sheets may be removably mounted in the trays. The supporting sheets may be of any food-safe material such as stainless steel or plastic. The sheets desirably provide a minimum of sticking. The supporting sheets are removably mounted in the tray frames so that they may be removed and flexed to pop off any food chips which are stuck to the sheet. The removability feature also provides for interchanging of sheets having various opening sizes. The sheet can be removed from the frame and moved into a funnel-like shape while the contents are poured into a container. It is desirable to use support sheets having the largest openings possible while still serving to support the food pieces.

If desired, pans can also be provided of substantially the same size as the trays. Such pans may be used interchangably with the trays and are desirable for use in drying liquids.

The dehydrator consists of a drying chamber containing a plurality of the removable frames each containing the supporting sheet disposed in a plurality of parallel, horizontal planes and held in place by projections extending from the sides of the cabinet. The trays are preferably light weight plastic, which permits them to be easily inserted and removed from the cabinet. The supporting sheets desirably are formed from a flexible plastic also permitting easy food removal. When flexed, the sheets can be used to funnel the dried food into storage containers.

A plenum chamber has provisions for intake of both make-up and recirculated air. An electrical heating element, temperature control and blower are disposed in a zone adjacent to one side of the drying chamber. An adjustable valve permits selection of the desired ratio of make-up air to recirculate air. A perforate plate or wall having a large number of small openings defined therein is disposed between the plenum chamber and the drying chamber and provides an access path for the heated air.

The air is drawn into this plenum chamber, both from the exhaust side of the drying chamber and from the outside through the filter. The adjustable valve element controls the mixture ratio of recirculated and make-up air. Recirculation of at least some heated air conserves energy and also enhances the final product for a number of foods. This air mixture is directed over an electrical heating element and thence to the perforate plate. A temperature sensitive controller, consisting of a thermister and triac combination, controls the temperature of the air in the plenum chamber. The open area of the plate and blower capacity are balanced such that there is always a positive pressure in the plenum chamber. This positive pressure provides uniform distribution of air flow through all openings in the plate. After passing through the plate, the uniform flow is directed horizontally across the food to be dehydrated which, as mentioned, is placed on the plastic trays located in the drying chamber. Because of the design employed, each shelf or tray in the chamber receives essentially the same volume of air across its upper and lower surfaces.

The screen-type trays have a large number of openings of predetermined size which permit the heated air which is directed against the underside of the trays to contact the underside of the food on the trays to dry the food on all sides. These trays are readily removable for cleaning. A set of screens of various size openings may be provided in order to optimize the drying of various types and sizes of food.

The air is exhausted from the drying chamber into an enclosure which permits part of the air to exhaust to the outside, while the remainder is directed back to the fan. This recirculated air combines with the make-up air to charge the plenum chamber. The cycle is then repeated with the recirculated air and make-up air.

DETAILED DESCRIPTION OF THE PREFERRED EMBODIMENT

Figure 1:
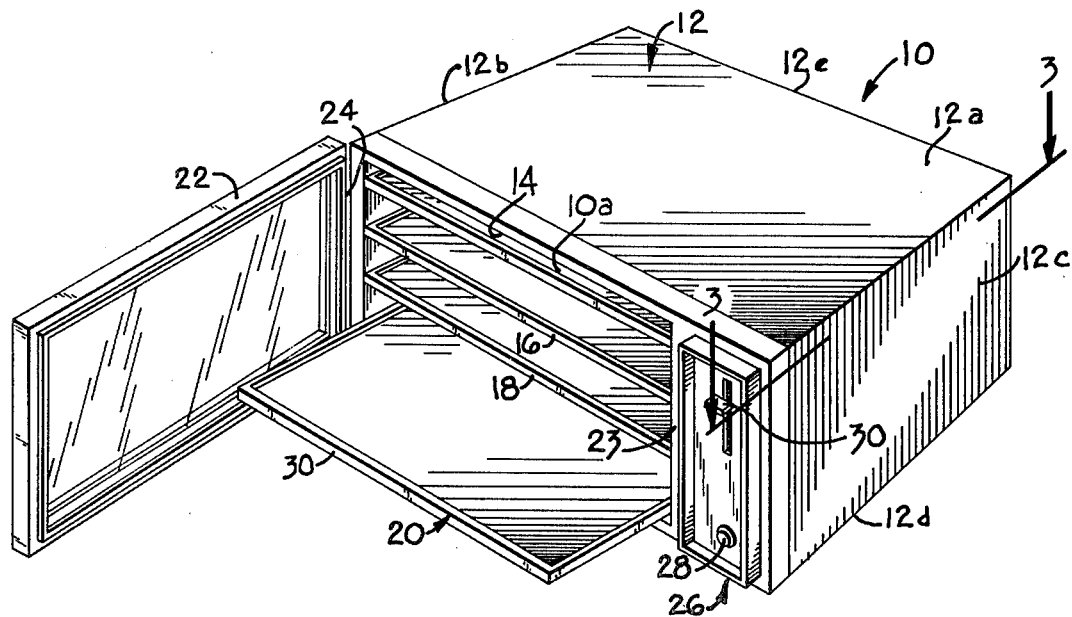
FIG. 1 illustrates a perspective view of the food dehydrator with one frame and tray only partially inserted into the dehydrator.

Referring first to FIG. 1, the relationship of certain of the major elements comprising the food dehydrator 10 can be seen. An outer shell 12 is formed from sheetmetal and includes a top 12a, left and right sides, 12b and 12c, bottom and rear surfaces 12d and 12e respectively. A front opening 10a provides access into the drying chamber 14 which contains a set of horizontal trays extending across the entire drying chamber area. Two trays 16 and 18 are shown totally inserted into the chamber 14. A third tray 20 is shown partially inserted into the unit. The trays 16, 18 and 20 are slightly smaller in both length and width than the corresponding dimensions of the drying chamber 14 such that the trays may be easily inserted into and removed from the chamber 14.

A door 22 is mounted on the cabinet by means of two hinges 24 on the left side of the food dehydrator 10. The hinges 24 permit closing of the door 22 to thereby close and seal the front opening 10a of the drying chamber 14. A magnetic latch 23 can be advantageously used to secure the door in the closed position.

A control panel 26 contains an on/off switch 28 and a slide dial temperature control 30. Calibration markings adjacent to the slide dial control permit the selection of the desired air drying temperature.

Figure 2:
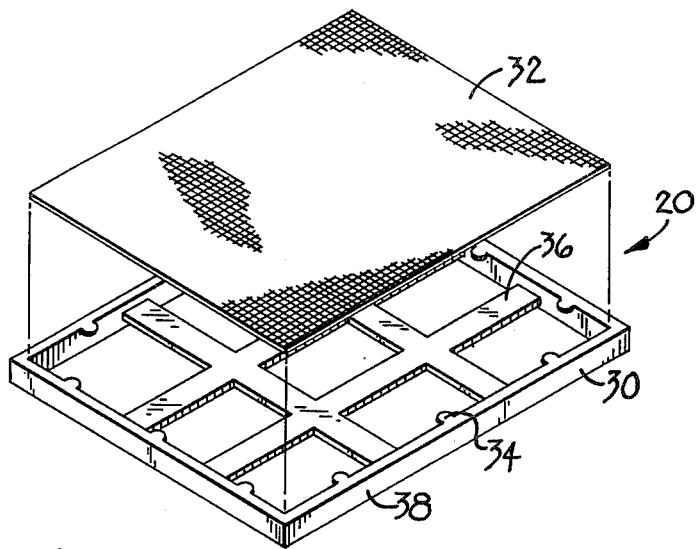
FIG. 2 is an isometric, exploded view of one tray, including frame and screen used in the apparatus of FIG. 1.

Referring next to FIG. 2, the construction of the tray 20 will be explained. The tray 20 includes frame 30, a supporting structure on which a perforated, flexible, plastic sheet or screen 32 may rest. This sheet 32 is replaceable and is held in place by button-like projections 34 molded in the sides 38 of the frame. A lattice framework floor of intersecting ribs 36 provides support beneath the screen 32, while the sides 38 hold the screen in position. The screen 32 may be mounted within the frame 20 by slightly flexing and inserting the screen under the various projections 34, the screen being supported by the ribs 36. Since the screen 32 is removable, a plurality of screens having various mesh sizes can be substituted in any given frame or, if desired, a nonperforated sheet may be utilized.

Figure 3:
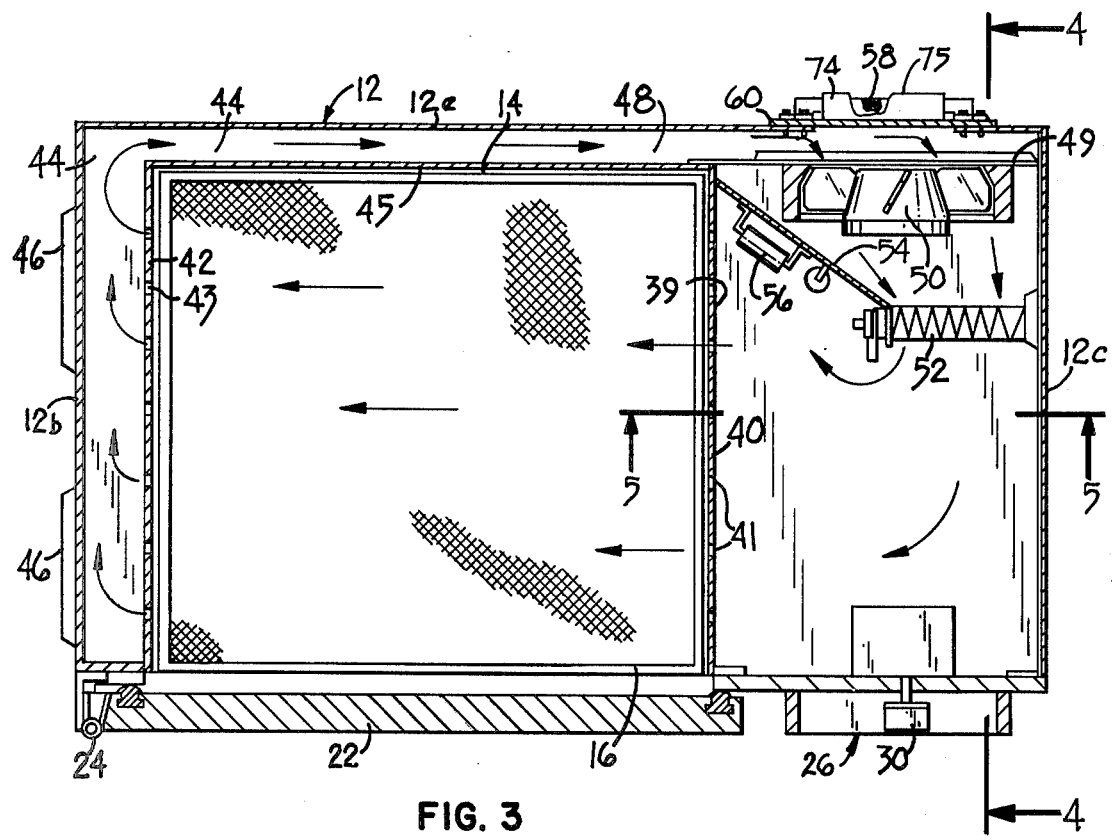
FIG. 3 is a top, cross-sectional view of the present food dehydrator taken along the line 3—3 in FIG. 1.

The air circulation and control apparatus for the entire food dehydrator can be seen in FIG. 3. A plenum chamber 39 is separated from the drying chamber 14 by a wall 40 containing rows of horizontal openings 41 above each tray position.

The ratio of air flow to the open area in wall 40 is such that a mild positive pressure is created at the upstream side of wall 40. The pressure is sufficient to force air through all of the openings in wall 40 at a substantially uniform rate. One satisfactory embodiment of the present invention included a wall 40 of 127.5 square inches with an open area of 26.5 percent. A suitable fan was of a size of approximately 85 cubic feet per minute free air. The air velocity in the wall openings was 400 cubic feet per minute and the pressure on the upstream side of wall 40 was about 0.03 inches of water (above ambient pressure).

A second wall 42 on the side of the chamber opposite wall 40 also contains rows of horizontal openings 43 which allow egress of air into a zone 44 defined by the walls 42 and 45 of chamber 14 and outer shell 12 of the unit. The wall 42 desirably is at least as open as wall 40 and may be somewhat more open. The rear panel 45 of the drying chamber 14 is solid, while the front opening 10a is sealed by the door 22. A set of louvers 46 on the side of the outer shell 12 provides an exhaust path for air from the zone 44 to the outside atmosphere. Louvers 46 may be opened or closed.

A rear duct 48 provides a return path for air to the plenum chamber 39. An electrical motor and fan 50 are mounted on the rear wall 49 of the plenum chamber 39 through a cut-out and an electrical heating element 52 is mounted within the plenum chamber 39. A baffle 54 directs the air flow from the fan 50 to the area of the heating element 52. Electrical control elements 56 regulate the amount of power delivered to the heating element. A filter 58 is mounted on the rear of the back plate 60 of the food dehydrator 10 for removing dust and other airborne particles from the air entering the unit.

Figure 4:
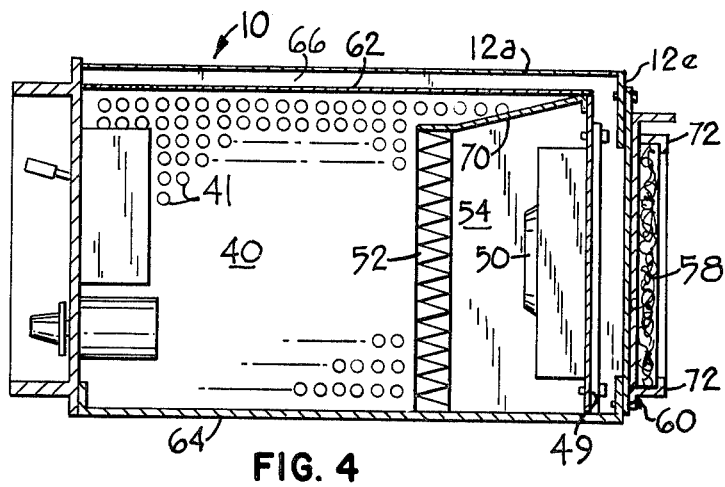
FIG. 4 is a side, cross-sectional view showing the plenum chamber taken along the line 4—4 in FIG. 3.

It can be seen in FIG. 4 that the top 62 and bottom 64 of the drying chamber 40 are solid and provide no air exhaust. A duct 66 is formed between the top 62 of the drying chamber 40 and the top 12a of the outer shell 12. A baffle plate 70 directs the air to the heating element 52. Brackets 72, which are attached to the back 12e of the food dehydrator 10, provide a sliding support for a replaceable filter element 58.

Figure 5:
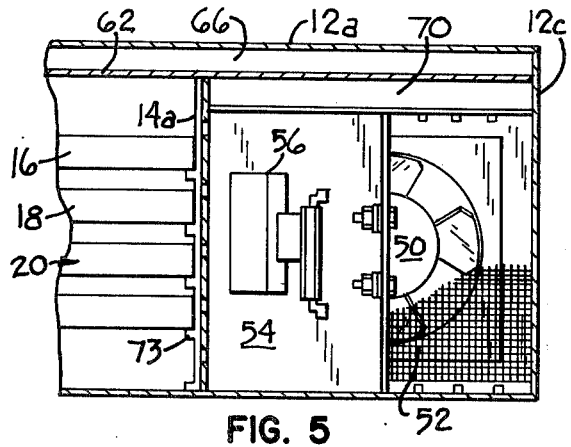
FIG. 5 is a front, cross-sectional view of the plenum chamber.

In FIG. 5, the projections 73 extending from the sides 14a of the drying chamber 14, are arranged to support the trays 16, 18 and 20 in a parallel and spaced-apart relationship.

Figure 6:
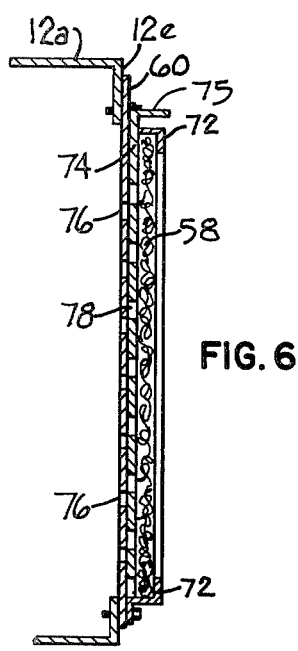
FIG. 6 is a top, cross-sectional view of the filter and proportioning valve adjusting means.

As is shown in FIG. 6, a slide 74 having a handle 75 is arranged to fit between the brackets 72 adjacent to the filter 58. A set of openings 76 in the rear panel 60 are adjacent to a set of openings 78 of a corresponding diameter in the slide 74. The slide 74 is free to move a short distance along the brackets 72. When the slide 74 is downward, holes 78 and 76 are aligned, which provides the maximum of air intake. When the slide is in the upward most position, the openings are out of alignment and a minimum amount of air intake is provided. Intermediate positions of the slide result in intermediate amounts of air intake.

OPERATION

In operation, the desired size screen 32 for the type of food to be treated is selected and inserted into the trays 16, 18, 20, etc. The trays are then inserted completely into the drying chamber 14 supported on a set of opposing projections 73. A set of screens can be provided, each screen having a different opening size. A screen having the desired opening size for the particular type of food being treated can be mounted in the tray. In general, screens of a small sized mesh will be used for smaller foods, while ones with a larger mesh size will be used for larger sized pieces of food. A solid sheet may be used for drying of foods having a slurry consistency. In addition, liquids may be dried on the floor of the drying chamber 14.

The food is loaded onto the proper tray such as 20, the door 22 is closed into contact with its magnetic latch 23 and thereby secured. The proper proportion of make-up air is selected by the location of the slide 74. The desired air temperature is selected by adjustment of the temperature control 30, to the proper position and the switch 28 is moved to the on position.

The flexibility afforded by the selection of temperature and air intake ratio is important. Foods such as meats and onions, can be dried side-by-side with no mixing of tastes when the air intake ratio is at a maximum. The relative humidity is also effected by the ratio of intake air.

The relative humidity decreases, more or less exponentially, with the length of the drying time. If the amount of intake air ratio is at a maximum at the beginning of the drying cycle, the relative humidity can be lowered and the drying process accelerated. Later in the drying cycle, the ratio of intake air to recirculated air can be lowered to increase the relative humidity thereby preventing overdrying of the exterior surface of the foods. This also has the effect of reducing the power requirements since the recirculated air has already been heated.

Certain foods dry better in the presence of high humidity, while others dry better in the presence of low humidity. The temperature of the drying can also be very critical. The possibility of varying both parameters over a wide range of continuous adjustments results in a superior product regardless of the drying conditions required.

While reference has been made to a temperature control device for the electrical heating element 52, no electrical schematic diagram has been included illustrating the details of this structure. Many circuits are known in the art and are commercially available for thermostatically controlling the flow of current through a resistance heating element, making such a disclosure unnecessary. Also, it would be possible to incorporate a filament-type humidistat into the system for controlling the temperature and/or fan energization as a function of humidity within the drying chamber.

The simple construction of the dehydrator of the present invention makes it inexpensive to manufacture while providing most of the features of substantially more complicated and expensive units designed for the same purpose.

While a preferred embodiment has been shown, those skilled in the art may make various modifications without departing from the spirit and scope of the invention as defined by the following claims.

What is claimed is:

1. Apparatus for removing the moisture content of foodstuffs in a controlled manner comprising in combination:
   (a) an outer shell having at least three side walls, a top and a bottom, said shell defining an opening;
   (b) a door member hingedly mounted and adapted to seal said opening when said door is in its closed position;
   (c) an inner shell and a plurality of trays, said inner shell having two sides, a back, a top and a bottom disposed within said outer shell, the open front of said inner shell being juxtaposed to said opening in said outer shell, said two sides each having defined therein a plurality of horizontal rows of apertures spaced apart from one another by uniform predetermined distances, said apertures allowing the passage of air therethrough, said trays each including a rectangular frame with a lattice frame-work floor comprising intersecting ribs and a flexible screen removably supported within said frame;
   (d) means on said two sides of said inner shell for supporting a plurality of trays in parallel, horizontal, spaced apart relationships, said trays being disposed intermediate said rows of apertures;
   (e) means for supplying pressurized air to a zone defined by said outer shell and one of said two sides of said inner shell such that said air flows through the apertures in said one of said two sides, across said plurality of trays and through the apertures in the other of said two sides, said air supply means and the apertures of said one side being balanced so that air supply means provides sufficient pressure to assure uniform air flows through all of the apertures in said one side whereby each tray receives essentially the same volume of air across its upper and lower surfaces;
   (f) means for recirculating at least a part of the air passing through said other of said two sides back to said means for supplying air under pressure; and
   (g) vent means for controlling the amount of air entering from outside said outer shell, said entering air being subsequently mixed with said recirculated air.

2. Apparatus as in claim 1 wherein said means for supplying air under pressure comprises:
   (a) a plenum chamber contained within said outer shell and juxtaposed to said one of said two sides;
   (b) a port formed in said plenum chamber; and
   (c) a motor-driven fan mounted in proximity to said port for drawing air from outside said outer shell and from said recirculating means.

3. A food dehydrator apparatus including a box-like drying chamber including a plurality of removable trays, a plenum chamber and a perforate wall, said perforate wall being disposed between said drying chamber and said plenum chamber, said plenum chamber being disposed adjacent one vertical side of said box-like drying chamber, said plenum chamber being coextensive with said one side, said perforate wall having a plurality of horizontal rows of apertures for exuding air from said plenum chamber into said drying chamber uniformly in a plurality of horizontal layers, said plenum chamber further including a fan for creating a positive air pressure within said plenum chamber, said fan and the apertures being balanced so that said fan provides a positive pressure of about 0.03 inches of water above ambient pressure on the upstream side of said perforate wall thereby assuring uniform air flow through all of the apertures in said perforate wall, said trays being supported in spaced relationship with each other, each of said trays including a frame and a removable support sheet, said frame including releasible securing means comprising inwardly extending projections from the circumferential edges of said tray, said sheet being insertable beneath said projections.

* * * * *